US 8,887,684 B2

(12) United States Patent
Izumoto et al.

(10) Patent No.: US 8,887,684 B2
(45) Date of Patent: Nov. 18, 2014

(54) IDLING STOP APPARATUS AND METHOD FOR DISABLING IDLING STOP FUNCTION

(75) Inventors: Ryoh Izumoto, Kobe (JP); Motoki Komiya, Kobe (JP); Yuichiro Shimizu, Kobe (JP); Yoshinori Shibachi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 308 days.

(21) Appl. No.: 13/498,022

(22) PCT Filed: Sep. 17, 2010

(86) PCT No.: PCT/JP2010/066159
§ 371 (c)(1),
(2), (4) Date: Mar. 23, 2012

(87) PCT Pub. No.: WO2011/037081
PCT Pub. Date: Mar. 31, 2011

(65) Prior Publication Data
US 2012/0221229 A1    Aug. 30, 2012

(30) Foreign Application Priority Data

Sep. 25, 2009   (JP) ................................ 2009-220747

(51) Int. Cl.
*F02N 11/08*    (2006.01)
*F02D 29/02*    (2006.01)

(52) U.S. Cl.
CPC ............. *F02D 29/02* (2013.01); *F02N 2250/02* (2013.01); *F02N 11/0862* (2013.01); *F02N 2300/30* (2013.01); *F02N 11/0825* (2013.01); *Y02T 10/48* (2013.01)
USPC ...................... 123/179.4; 123/179.3; 701/112; 701/114; 701/115; 307/10.6; 307/10.7

(58) Field of Classification Search
CPC .................... F02D 29/00–29/06; F02D 45/00; B60R 16/02; B60W 10/00; F02N 11/106
USPC ............................ 123/179.3, 179.4, 198 DB; 701/112–115; 307/10.1, 10.6, 10.7
See application file for complete search history.

(56) References Cited

U.S. PATENT DOCUMENTS 5,400,341 A    3/1995 Makino et al.
6,275,759 B1 *  8/2001 Nakajima et al. ............... 701/54

(Continued)

FOREIGN PATENT DOCUMENTS

JP    A-5-282079    10/1993
JP    A-8-177693    7/1996
JP    A-11-34766    2/1999

(Continued)

OTHER PUBLICATIONS

International Search Report dated Dec. 14, 2010 in International Application No. PCT/JP2010/066159 (with translation).

*Primary Examiner* — Thomas Moulis
*Assistant Examiner* — Joseph Dallo
(74) *Attorney, Agent, or Firm* — Oliff PLC

(57) ABSTRACT

An idling stop apparatus is provided which can prevent a voltage of a battery from being lowered even when a microcomputer is reset. In an idling stop apparatus when a reset condition is established, reset information indicating that the reset condition is established is stored in a latch circuit and a microcomputer disables an idling stop function when the reset information is stored. The reset information is stored in the latch circuit even when the microcomputer is being reset or even after the microcomputer is reset. Accordingly, the microcomputer after the reset can disable the idling stop function. As a result, it is possible to prevent the voltage of the battery from being lowered due to the idling stop function.

6 Claims, 10 Drawing Sheets

(56) References Cited

U.S. PATENT DOCUMENTS

| | | | |
|---|---|---|---|
| 6,947,827 B2 * | 9/2005 | Fuse et al. | 701/110 |
| 7,156,065 B2 * | 1/2007 | Sommerfeld et al. | 123/179.3 |
| 2003/0089326 A1 * | 5/2003 | Ujifusa | 123/179.4 |
| 2005/0145217 A1 * | 7/2005 | Takama et al. | 123/339.11 |
| 2010/0269776 A1 * | 10/2010 | Mizuno | 123/179.4 |

FOREIGN PATENT DOCUMENTS

| | | | |
|---|---|---|---|
| JP | A-2000-337188 | | 12/2000 |
| JP | A-2003-330580 | | 11/2003 |
| JP | 2006328965 A | * | 12/2006 |
| JP | A-2006-328965 | | 12/2006 |
| JP | A-2009-13953 | | 1/2009 |

* cited by examiner

IDLING STOP APPARATUS AND METHOD FOR DISABLING IDLING STOP FUNCTION

TECHNICAL FIELD

The invention relates to an idling stop technology of automatically stopping/starting an engine of a vehicle.

BACKGROUND ART

In recent years, in order to save the fuel or to reduce the exhaust gas, an idling stop apparatus has been put to practical use which automatically stops/starts an engine of a vehicle while the vehicle is stopped for relatively short time such as waiting at stoplights. For a vehicle having the idling stop apparatus, when a stop condition is established, for example when the vehicle is shifted from a traveling state to a stopped state as the brake is stepped, the engine is automatically stopped, and when a start condition is established, for example when the brake is released while the engine is stopped, the engine is enabled to automatically start (for example, refer to Patent Document 1).

PRIOR ART DOCUMENT

Patent Document

Patent Document 1: Japanese Patent Application Publication No. 2009-13953

SUMMARY OF INVENTION

Problems to be Solved by Invention

The power of respective units of the vehicle is fed from a battery that is provided to the vehicle. However, the battery is charged by using rotating force of the engine. When a voltage of the battery is lowered, it may be difficult to feed the power to the respective units of the vehicle. Therefore, in order not to lower the voltage of the battery, it is preferable not to stop the vehicle to the extent possible. Hence, when the voltage of the battery is lowered somewhat, it is preferable to disable the idling stop function of automatically stopping the engine.

The idling stop function is realized by a microcomputer that is provided to the idling stop apparatus. Accordingly, a configuration is considered in which the microcomputer monitors the voltage of the battery and disables the idling stop function when the voltage of the battery is lowered below a predetermined threshold.

Meanwhile, the power that drives a starter motor for starting the engine is fed from the battery. Likewise, the power for operating the microcomputer of the idling stop apparatus is also fed from the battery via a decreasing regulator.

Since the power that the starter motor requires for the engine start is very high, the voltage of the battery is remarkably lowered at the start time of the engine. When the lowered voltage of the battery is lowered below a predetermined threshold, it is preferable that the microcomputer of the idling stop apparatus disables the idling stop function.

However, when the voltage of the battery is remarkably lowered below a minimum operating voltage of the microcomputer, the microcomputer cannot be operated and is reset. Thereby, since the microcomputer having restarted after the reset cannot figure out the voltage of the battery before the reset, the microcomputer enables the idling stop function. As a result, even though the voltage of the battery has been considerably lowered, the automatic stop of the engine is executed, so that the voltage of the battery may be further lowered.

The invention has been made to solve the above problems. An object of the invention is to provide a technology capable of preventing a voltage of a battery from being lowered even after a microcomputer of an idling stop apparatus is reset.

Means for Solving Problems

The object of the invention is realized by following configurations.

(1) An idling stop apparatus to be mounted on a vehicle, including a microcomputer having an idling stop function of automatically stopping an engine of the vehicle when a predetermined stop condition is established and of automatically starting the engine when a predetermined start condition is established while the engine is stopped, a detector that detects that a reset condition for resetting the microcomputer is established, and a storage that stores reset information which indicates that the reset condition is established when the detector detects that the reset condition is established even when the microcomputer is being reset, wherein the microcomputer disables the idling stop function when the storage stores the reset information.

(2) In the idling stop apparatus described in the above (1), the storage includes only one logic circuit capable of storing information of 1 bit.

(3) In the idling stop apparatus described in the above (1), the storage deletes the reset information when detecting an ignition switch of the vehicle is turned off.

(4) In the idling stop apparatus described in the above (3), the storage starts operating in a state of storing the reset information when a voltage applied to the storage transits from a state below a minimum operating voltage of the storage to a state above the minimum operating voltage of the storage, and the minimum operating voltage of the storage is higher than a reference voltage which is used for detecting the ignition switch is turned on.

(5) In the idling stop apparatus described in the above (1), a minimum operating voltage of the microcomputer is higher than a minimum operating voltage of the storage.

(6) In the idling stop apparatus described in the above (1), the detector detects that the reset condition is established on the basis of a power-supply voltage of the microcomputer, which is obtained by decreasing a voltage of a battery of the vehicle.

(7) In the idling stop apparatus described in the above (6), the detector detects that the reset condition is established on the basis of both the power-supply voltage of the microcomputer and the voltage of the battery.

(8) In the idling stop apparatus described in the above (6), the power-supply voltage of the microcomputer is obtained by decreasing the voltage of the battery by a plurality of decreasing units, and the detector detects that that the reset condition is established on the basis of both the power-supply voltage of the microcomputer and a voltage between the decreasing units.

(9) An idling stop apparatus to be mounted on a vehicle, including a microcomputer having an idling stop function of automatically stopping an engine of the vehicle when a predetermined stop condition is established and of automatically starting the engine when a predetermined start condition is established while the engine is stopped, a detector that detects that a power-supply voltage of the microcomputer becomes below a minimum operating voltage of the microcomputer, and a prohibiting unit that prohibits the microcomputer from executing the idling stop function after the microcomputer is reset when the detector detects that the power-supply voltage of the microcomputer becomes below the minimum operating voltage of the microcomputer.

(10) A method for disabling an idling stop function of automatically stopping an engine of a vehicle when a predetermined stop condition is established and of automatically starting the engine when a predetermined start condition is established while the engine is stopped, detecting that a reset condition for resetting a microcomputer having the idling stop function is established, storing reset information which indicates that the reset condition is established when detecting that the reset condition is established even when the microcomputer is being reset, and disabling the idling stop function of the microcomputer when the reset information is stored.

(11) A method for disabling an idling stop function of automatically stopping an engine of a vehicle when a predetermined stop condition is established and of automatically starting the engine when a predetermined start condition is established while the engine is stopped, detecting that a power-supply voltage of a microcomputer having the idling stop function becomes below a minimum operating voltage of the microcomputer, prohibiting the microcomputer from executing the idling stop function after the microcomputer is reset when detecting that the power-supply voltage of the microcomputer becomes below the minimum operating voltage of the microcomputer.

Advantageous Effects of Invention

According to the configurations of the above (1) to (8) and (10), when the reset condition is established, the reset information indicating that the reset condition is established is stored, and when the reset information is stored, the microcomputer disables the idling stop function. Since the reset information is stored even when the microcomputer is being reset, the microcomputer can disable the idling stop function after the reset. As a result, it is possible to prevent the voltage of the battery from being lowered due to the idling stop function.

Also, in particular, according to the configuration of the above (2), it is possible to realize the idling stop apparatus at low cost.

Also, in particular, according to the configuration of the above (3), when the ignition switch is turned off, the reset information is deleted. Therefore, it is possible to enable the idling stop function when a user gets in the vehicle next time.

Also, in particular, according to the configuration of the above (4), the storage starts operating in a state of storing the reset information and the minimum operating voltage of the storage is higher than a reference voltage that is used for detecting the ignition switch is turned on. Accordingly, even when an operating power-supply voltage of the storage is lowered below the minimum operating voltage, it is possible to disable the idling stop function.

Also, in particular, according to the configuration of the above (5), a minimum operating voltage of the microcomputer is higher than a minimum operating voltage of the storage. Therefore, even when an operating power-supply voltage of the storage is lowered below the minimum operating voltage, since the storage securely operates when the microcomputer restarts, it is possible to perform a stable operation.

Also, in particular, according to the configuration of the above (6), when the reset condition is established due to a cause except for the voltage drop of the battery, such as runaway of the microcomputer, it is possible to prevent the idling stop function from being disabled.

Also, in particular, according to the configuration of the above (7), when the reset condition is established due to a cause except for the voltage drop of the battery, such as ground fault of a power-supply line of the microcomputer, it is possible to prevent the idling stop function from being disabled.

Also, in particular, according to the configuration of the above (8), when the reset condition is established due to a cause except for the voltage drop of the battery, such as ground fault of a power-supply voltage of the microcomputer, it is possible to prevent the idling stop function from being disabled. Also, since the voltage between the plurality of decreasing units, rather than the voltage of the battery, is detected, it is possible to stably detect that the reset condition is established, without the influence of the noise, compared to a configuration of directly detecting the voltage of the battery.

Also, in particular, according to the configurations of the above (9) and (11), when a power-supply voltage of the microcomputer becomes below a minimum operating voltage of the microcomputer, the execution of the idling stop function is prohibited after the microcomputer is reset. Accordingly, it is possible to prevent the voltage of the battery from being lowered due to the idling stop function.

MODE TO CARRY OUT INVENTION

Hereinafter, illustrative embodiments of the invention will be described with reference to the drawings.

1. First Illustrative Embodiment 1-1. Configuration

Figure 1:
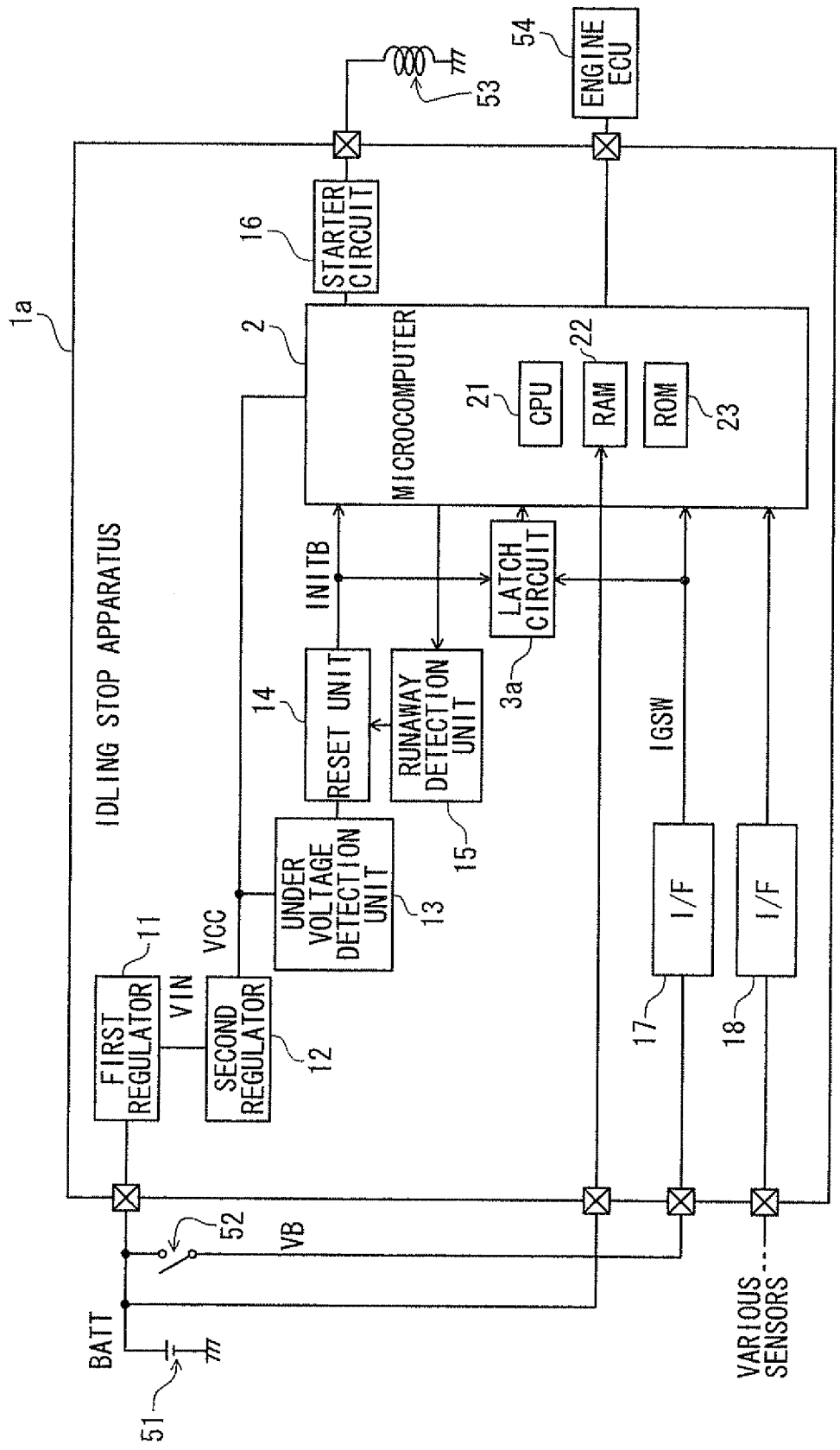
FIG. 1 shows a configuration of an idling stop apparatus according to a first illustrative embodiment.

FIG. 1 is a block diagram showing a configuration of an idling stop apparatus 1a of a first illustrative embodiment and peripheral elements thereof. The idling stop apparatus 1a is mounted on a vehicle such as automobile and has a function of automatically stopping/starting an engine of the vehicle while the vehicle is stopped for relatively short time such as waiting at stoplights. The vehicle on which the idling stop apparatus 1a is mounted has a battery 51, and power is fed from the battery 51 to respective units of the vehicle such as starter motor of the engine, idling stop apparatus 1*a* and the like.

The idling stop apparatus 1*a* consists of an ECU (Electronic Control Unit) and has a microcomputer 2 as a main constitutional element. The microcomputer 2 has a CPU 21, a RAM 22 and a ROM 23. A variety of functions of the microcomputer 2 are implemented as the CPU 21 performs calculation processing in response to programs pre-stored in the ROM 23. The functions of the microcomputer 2 include the idling stop function and a function of disabling the idling stop function.

The idling stop function is a function of automatically stopping/starting an engine of the vehicle in response to a traveling state of the vehicle. Signals indicating the traveling state of the vehicle are input to the microcomputer 2 from various sensors mounted on the vehicle through an interface 18. Specifically, vehicle speed from a vehicle speed sensor, a position of a shift lever from a shift sensor, an operation content of an accelerator from an accelerator sensor and an operation content of a brake from a brake sensor are respectively input as signals.

When a predetermined stop condition is established on the basis of the signals indicating the traveling state, the engine is stopped by the idling stop function. For example, when a variety of conditions such as 'vehicle speed is zero (0)', 'shift lever is positioned at D', 'there is no accelerator operation' and 'there is a brake operation' are satisfied, it is determined that the stop condition is established. When stopping the engine, the microcomputer 2 transmits a predetermined stop signal to an engine ECU 54 that controls the engine. The engine ECU 54 stops the engine in response to the stop signal.

Also, when a predetermined start condition is established on the basis of the signals indicating the traveling state while the engine is stopped by the idling stop function, the engine automatically starts by the idling stop function. For example, when a variety of conditions such as 'shift lever is positioned at D', 'there is an accelerator operation' and 'there is no brake operation' are satisfied, it is determined that the start condition is established. When starting the engine, the microcomputer 2 transmits a predetermined start signal to a starter control circuit 16 of the idling stop apparatus 1*a*. The starter control circuit 16 energizes a coil 53 in response to the signal. When the coil 53 is energized, a relay switch is closed and the power is thus fed from the battery 51 to the starter motor, so that the engine starts.

The disabling function of the microcomputer 2 is a function of disabling the idling stop function. When the voltage of the battery 51 is lowered, it may hinder the power feeding to the respective units of the vehicle. Therefore, it is preferable not to stop the engine to the extent possible so that the voltage of the battery 51 is not lowered. Thus, when it is determined that the voltage of the battery 51 is lowered below a predetermined threshold, the idling stop function is disabled by the disabling function of the microcomputer 2.

The voltage of the battery 51 of the vehicle is input, as a digital value, to the microcomputer 2. The microcomputer 2 stores a minimum value of the voltages of the battery 51, which are input in real time, in the RAM 22. Then, when the voltage of the battery 51 stored in the RAM 22 is lowered below a predetermined threshold, the microcomputer 2 disables the idling stop function thereafter. For example, a usual voltage of the battery 51 is 12V. However, when the voltage of the battery 51 becomes below 5V, the idling stop function is disabled. Since the minimum value of the voltage of the battery 51 is stored in the RAM 22 that is a volatile memory, when the microcomputer 2 is reset, the minimum value is deleted.

Also, when a predetermined signal is input from a latch circuit 3*a* that will be described later, the idling stop function is disabled by the disabling function of the microcomputer 2, which will be specifically described later.

The idling stop apparatus 1*a* has, as a power-supply circuit of the microcomputer 2, two regulators (first regulator 11 and second regulator 12) that decrease an input voltage to a constant voltage. The first regulator 11 is configured by a switching regulator that can decrease a voltage relatively largely. In the meantime, the second regulator 12 is configured by a series regulator that can decrease a voltage to a desired voltage in high precision.

The power of the microcomputer 2 is fed from the battery 51 of the vehicle. While an ideal value of the power-supply voltage of the microcomputer 2 is 5V, a usual voltage of the battery 51 is 12V. Therefore, in the idling stop apparatus 1*a*, a voltage BATT (ideal value: 12V) of the battery 51 is decreased to a predetermined voltage VIN (ideal value: 6V) in the first regulator 11, which is then further decreased in the second regulator 12 and thus the power-supply voltage VCC (ideal value: 5V) of the microcomputer 2 is obtained in high precision.

In the meantime, the regulators 11, 12 regulate an output voltage within a range in which an input voltage is an upper limit. When the input voltage is lowered below a voltage that should be maintained constant, the output voltage is also lowered below a desired voltage. That is, when the voltage BATT of the battery is lowered, the voltage VIN that is obtained by the decreasing in the first regulator 11 and the voltage VCC (the power-supply voltage of the microcomputer 2) that is obtained by the decreasing in the second regulator 11 are also lowered.

Also, the idling stop apparatus 1*a* has, as a circuit for resetting the microcomputer 2, an under voltage detection unit 13, a reset unit 14 and a runaway detection unit 15.

The under voltage detection unit 13 is connected to a power feed line from the second regulator 12 to the microcomputer 2 and monitors the power-supply voltage VCC of the microcomputer 2. When the power-supply voltage VCC of the microcomputer 2 becomes below a minimum operating voltage with which the microcomputer 2 can operate, the under voltage detection unit outputs an instruction signal to the rest unit 14, which signal indicates that a reset should be made. In the descriptions, the minimum operating voltage of the microcomputer 2 is indicated with a symbol Vt and is 3.9V, for example.

Figure 2:
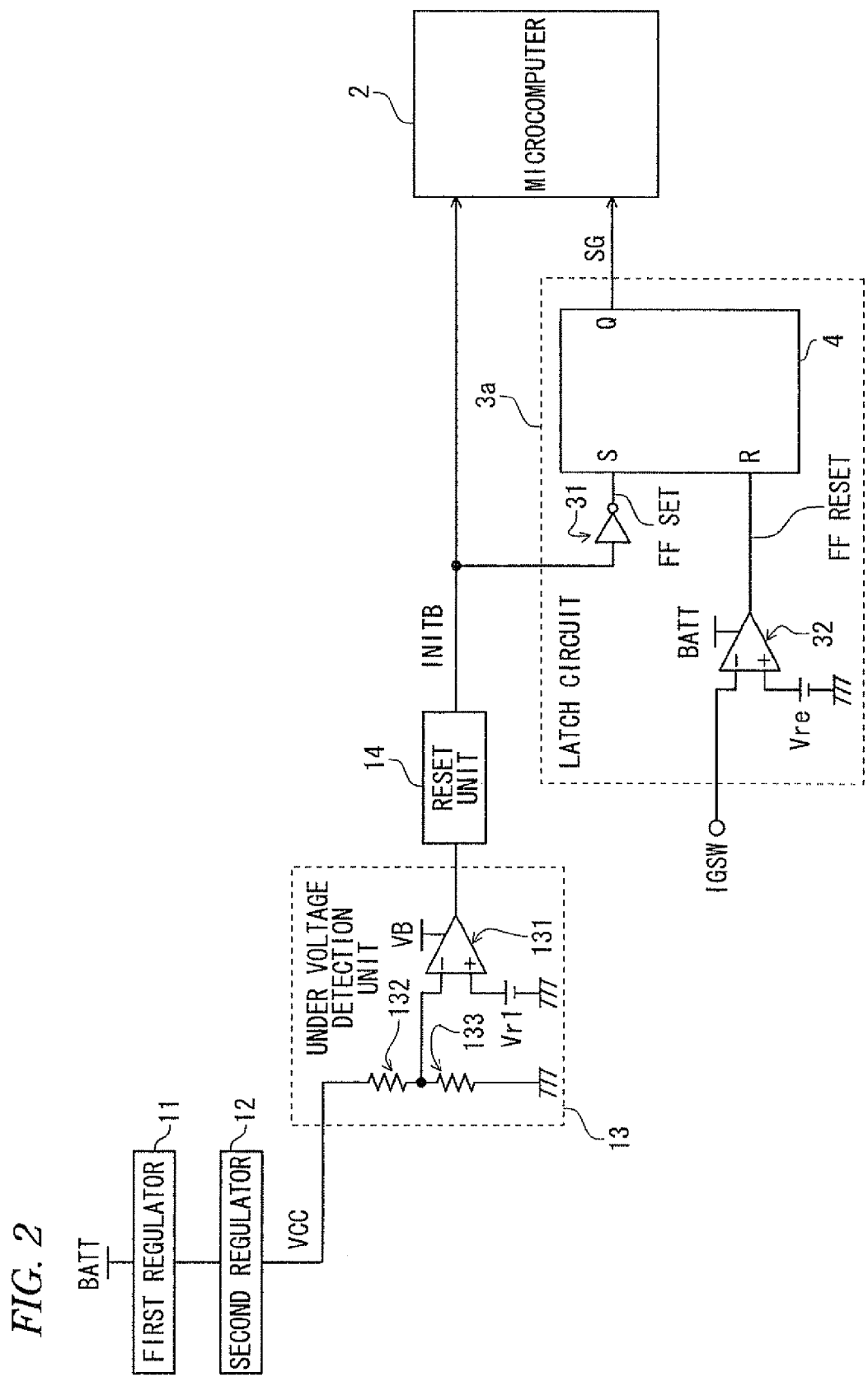
FIG. 2 shows a configuration of a latch circuit of the first illustrative embodiment.

As shown in FIG. 2, the under voltage detection unit 13 has a comparator 131. A non-inverting input terminal (+) of the comparator 131 is applied with a predetermined reference voltage Vr1. In the meantime, an inverting input terminal (−) of the comparator 131 is applied with a voltage that is obtained by dividing the power-supply voltage VCC of the microcomputer 2 by two resistances 132, 133. Thereby, when the divided voltage becomes below the reference voltage Vr1, an "H" signal is output, as the instruction signal, from an output terminal of the comparator 131. At this time, the power-supply voltage VCC of the microcomputer 2 becomes below the minimum operating voltage Vt of the microcomputer 2.

When the power-supply voltage VCC of the microcomputer 2 becomes below the minimum operating voltage Vt, the microcomputer 2 cannot operate. Therefore, it can be said that the case where the power-supply voltage VCC of the microcomputer 2 becomes below the minimum operating voltage Vt indicates that a reset condition for resetting the microcomputer 2 is established.

Returning to FIG. 1, the runaway detection unit 15 detects whether the microcomputer 2 is in a runaway state such as freeze. The runaway detection unit 15 monitors an operation signal of a watch dog timer of the microcomputer 2, for example. When a regular signal is not detected, the runaway detection unit determines that the microcomputer 2 is in a runaway state. In this case, the microcomputer 2 cannot restore the function thereof unless it is reset. Accordingly, the runaway detection unit 15 determines that a reset condition for resetting the microcomputer 2 is established and outputs an instruction signal to the reset unit 14, which signal indicates that the reset should be made.

The reset unit 14 outputs a reset signal INITB, which instructs the microcomputer 2 on the reset. The reset signal INITB is usually "H". When the reset signal becomes "L", the microcomputer 2 is instructed for the reset. When the reset condition is established and thus an instruction signal indicating that a reset should be made is input from any one of the under voltage detection unit 13 and the runaway detection unit 15, the reset unit 14 sets the reset signal INITB to be "L." The microcomputer 2 monitors the reset signal INITB all the time and is reset when the reset signal INITB becomes "L." That is, the microcomputer 2 stops the operation once and then restarts.

Also, the idling stop apparatus 1a has a latch circuit 3a that, when the reset condition is established, for example when the power-supply voltage VCC of the microcomputer 2 becomes below the minimum operating voltage Vt, stores information indicating that reset condition is established. Irrespective of the states of the microcomputer 2, the latch circuit 3a stores the information indicating that the reset condition is established even when the microcomputer 2 is being reset. Thereby, it is possible to inform the microcomputer 2 having restarted after the reset that the power-supply voltage VCC of the microcomputer 2 becomes below the minimum operating voltage Vt before the reset.

The latch circuit 3a is input with the reset signal INITB from the reset unit 14. Together this, the latch circuit 3a is input with an ignition signal IGSW from an ignition line downstream from an ignition switch 52 through an interface 17. The ignition signal IGSW indicates on/off states of the ignition switch 52 that is operated by a user so as to travel the vehicle. When the ignition switch 52 is ON, the ignition signal becomes "H" and when the ignition switch 52 is OFF, the ignition signal becomes "L."

FIG. 2 shows a configuration of the latch circuit 3a together with the peripheral constitutional elements thereof. The latch circuit 3a has an RS type flip-flop 4 that is a logic circuit capable of storing information of 1 bit, a NOT circuit 31 and a comparator 32.

Figure 3:
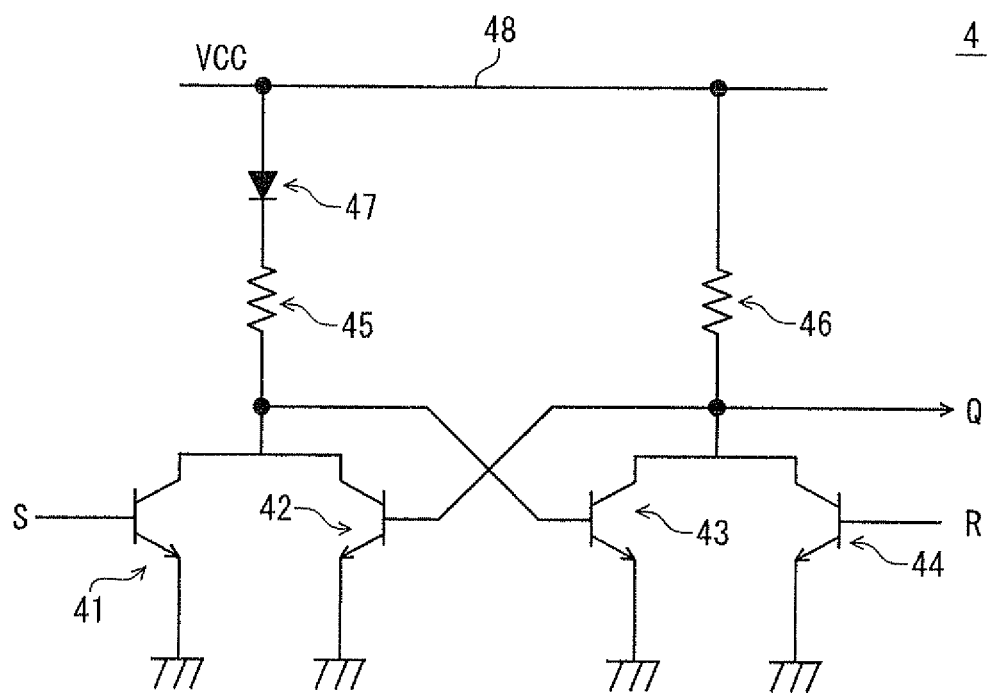
FIG. 3 shows an example of a configuration of a flip-flop of the first illustrative embodiment.

FIG. 3 shows an example of a configuration of the flip-flop 4. The flip-flop 4 has four NPN-type transistors 41 to 44, and emitters thereof are grounded. In the flip-flop 4, a base of the first transistor 41 is a set input terminal S and a base of the fourth transistor 44 is a reset input terminal R.

Collectors of the first transistor 41 and the second transistor 42 are connected to each other and are connected to a power-supply line 48 through a diode 47 and a resistance 45. Also, the collectors of the first transistor 41 and the second transistor 42 and a base of the third transistor 43 are connected to each other.

In the meantime, collectors of the third transistor 43 and the fourth transistor 44 are also connected to each other and are connected to the power-supply line 48 through a resistance 46. Also, the collectors of the third transistor 43 and the fourth transistor 44 and a base of the second transistor 42 are connected to each other. Voltages of the collectors of the third transistor 43 and the fourth transistor 44 become a voltage of an output terminal Q of the flip-flop 4.

A case is assumed in which "H" is applied to the set input terminal S of the flip-flop 4 and "L" is applied to the reset input terminal R. In this case, since current flows between the collector and emitter of the first transistor 41, the collector of the first transistor 41 becomes "L." Thereby, the base of the third transistor 43 having the same potential as the collector of the first transistor 41 also becomes "L" and the current between the collector and emitter of the third transistor 43 is cut off, so that the collector of the third transistor 43 becomes "H." Thereby, the base of the second transistor 42 having the same potential as the collector of the third transistor 43 also becomes "H" and the collectors of the first transistor 41 and the second transistor 42 are defined as "L." Also, "H" is output from the output terminal "Q" of the flip-flop 4 having the same potential as the collector of the third transistor 43.

A case is assumed in which "L" is applied to the set input terminal S of the flip-flop 4 and "L" is applied to the reset input terminal R at this state. In this case, the current between the collector and emitter of the first transistor 41 is cut off but the current flows between the collector and emitter of the second transistor 42. Hence, the collector of the second transistor 42 keeps the state "L." Accordingly, the base of the third transistor 43 also becomes "L" and the collector of the third transistor 43 becomes "H." As a result, the signal from the output terminal Q of the flip-flop 4 becomes "H." That is, even after "L" is applied to the set input terminal S, the state that "H" is applied to the set input terminal S is stored.

Also, a case is assumed in which "L" is applied to the set input terminal S of the flip-flop 4 and "H" is applied to the reset input terminal R. In this case, since current flows between the collector and emitter of the fourth transistor 44, the collector of the fourth transistor 44 becomes "L." Thereby, the base of the second transistor 42 also becomes "L" and the current between the collector and emitter of the second transistor 42 is cut off, so that the collector of the second transistor 42 becomes "H." Thereby, the base of the third transistor 43 also becomes "H", the collectors of the third transistor 43 and the fourth transistor 44 are defined as "L" and the signal that is output from the output terminal Q of the flip-flop 4 becomes "L.". That is, the stored content ("H" is applied to the set input terminal S) is deleted.

As the operating power-supply voltage of the flip-flop 4, the power-supply voltage VCC of the microcomputer 2 is applied. The flip-flop 4 stops the operation thereof when the operating power-supply voltage becomes below a predetermined minimum operating voltage. In the descriptions, the minimum operating voltage of the flip-flop 4 is indicated by a symbol Vu and is 1.6V, for example.

Also, when operating power-supply voltage of the flip-flop 4 transits from a state below the minimum operating voltage Vu to a state above the minimum operating voltage, the flip-flop 4 starts the operation thereof. The flip-flop 4 is configured to output "H" from the output terminal Q at the start time of the operation.

When the operating power-supply voltage of the flip-flop 4 is below the minimum operating voltage Vu, the operation of the flip-flop 4 is stabilized as one of the bases of the second transistor 42 and third transistor 43 becomes "H" and the other becomes "L." A current path from the power-supply line 48 to the ground includes a first path passing to the diode 47, the resistance 45 and between the base and emitter of the third transistor 43 and a second path passing to the resistance 46 and between the base and emitter of the second transistor 42.

Here, a case is assumed in which the operating power-supply voltage of the flip-flop 4 is gradually increased. Since the diode 47 exists on the first path, the first path is influenced by a voltage drop as much as that. Therefore, the base of the second transistor 42 on the second path becomes "H" faster than the base of the third transistor 43 on the first path. Hence, the operation of the flip-flop 4 is stabilized at a state in which the base of the second transistor 42 is "H" and the base of the third transistor 43 is "L." Thereby, the flip-flop 4 outputs "H" from the output terminal Q at the start time of the operation.

Returning to FIG. 2, the set input terminal S of the flip-flop 4 is connected with an output terminal of the NOT circuit 31. An input terminal of the NOT circuit 31 is input with the reset signal INITB that is output from the reset unit 14. Therefore, the set input terminal S of the flip-flop 4 is input with an inverted signal of the reset signal INITB.

As described above, when the reset condition is established, the reset signal INITB becomes "L." Therefore, when the reset condition is established, "H" is input to the set input terminal S of the flip-flop 4 and a latch signal SG from the output terminal Q of the flip-flop 4 becomes "H." Like this, the state in which the latch signal SG from the output terminal Q becomes "H" indicates a state in which information (hereinafter, also referred to as 'reset information') indicating that reset condition is established is stored in the flip-flop 4.

In the meantime, the reset input terminal R of the flip-flop 4 is connected with an output terminal of the comparator 32. The non-inverting input terminal (+) of the comparator 32 is applied with a predetermined reference voltage Vre and the inverting terminal (−) is input with the ignition signal IGSW. The reference voltage Vre is lower than the "H" voltage of the ignition signal IGSW and is 1.25V, for example. By this configuration, the on/off states of the ignition switch 52 are detected in the comparator 32, and "L" is output when the ignition switch 52 is turned on and "H" is output when the ignition switch is turned off. In the meantime, the voltage BATT of the battery 51 is directly applied, as the operating power-supply of the comparator 32. Therefore, even when the ignition switch 52 is turned off, the comparator 32 operates.

Thereby, the reset input terminal R of the flip-flop 4 is input with "L" when the ignition switch 52 is turned on and is input with "H" when the ignition switch is turned off. Therefore, when the ignition switch 52 is turned off, the latch signal SG from the output terminal Q of the flip-flop 4 becomes "L." That is, when the ignition switch 52 is turned off, the reset information is deleted from the flip-flop 4.

Like this, when the reset condition is established, the reset information is stored in the flip-flop 4 and the latch signal SG from the output terminal Q becomes "H." Since the flip-flop 4 is not influenced by the operation of the microcomputer 2, the reset information is stored in the flip-flop 4 even when the microcomputer 2 is being reset or even after the reset. While the reset information is stored in the flip-flop 4, the latch signal SG from the output terminal Q becomes "H." Then, when the ignition switch 52 is turned off, the reset information is deleted from the flip-flop 4 and the latch signal SG from the output terminal Q becomes "L."

The "H" latch signal SG that is output from the flip-flop 4 is input to the microcomputer 2. Thereby, it is possible to inform the microcomputer 2 having restarted after the reset that the reset condition has been established before the reset. More specifically, it is possible to inform the microcomputer 2 after the reset that the power-supply voltage VCC of the microcomputer 2 becomes below the minimum operating voltage Vt.

The microcomputer 2 monitors the latch signal SG from the flip-flop 4 of the latch circuit 3a. When the latch signal SG is "L", the microcomputer 2 enables the idling stop function. However, when the latch signal SG is "H", the microcomputer 2 disables the idling stop function by the disabling function. Thereby, when the power-supply voltage VCC of the microcomputer 2 becomes below the minimum operating voltage Vt, the microcomputer 2 disables the idling stop function after the microcomputer 2 is reset. Hence, it can be said that the "H" latch signal SG that is output from the flip-flop 4 of the latch circuit 3a is a prohibiting signal that prohibits the microcomputer 2 from executing the idling stop function after the microcomputer 2 is reset.

1-2. Disabling Operation

In the below, the operation of disabling the idling stop function of the microcomputer 2 is described more specifically. As described above, the idling stop function is disabled by the disabling function of the microcomputer 2. A disabling condition is any one of a first condition that the voltage of the battery 51 is lowered below a predetermined threshold and a second condition that a prohibiting signal is output from the latch circuit 3a. The case where a prohibiting signal is output from the latch circuit 3a indicates a case where the reset information is stored in the flip-flop 4 of the latch circuit 3a.

When the voltage of the battery 51 is lowered and thus becomes below 5V, for example, due to the engine start and the like, the first condition is applied, so that the idling stop function of the microcomputer 2 is disabled. However, when the voltage of the battery 51 is further lowered and thus becomes below the minimum operating voltage Vt (for example, 3.9V) of the microcomputer 2, the power-supply voltage of the microcomputer 2 also becomes below the minimum operating voltage Vt (for example, 3.9V) of the microcomputer 2 and the microcomputer 2 is thus reset.

When the microcomputer 2 is reset as described above, the content (minimum value of the voltage of the battery 51) of the RAM 22 of the microcomputer 2 is deleted. Hence, the first condition is not applied. In the meantime, the reset information is stored in the flip-flop 4, so that a prohibiting signal is output from the latch circuit 3a. Therefore, the second condition is applied, so that the idling stop function of the microcomputer 2 is disabled even after the reset.

Figure 4:
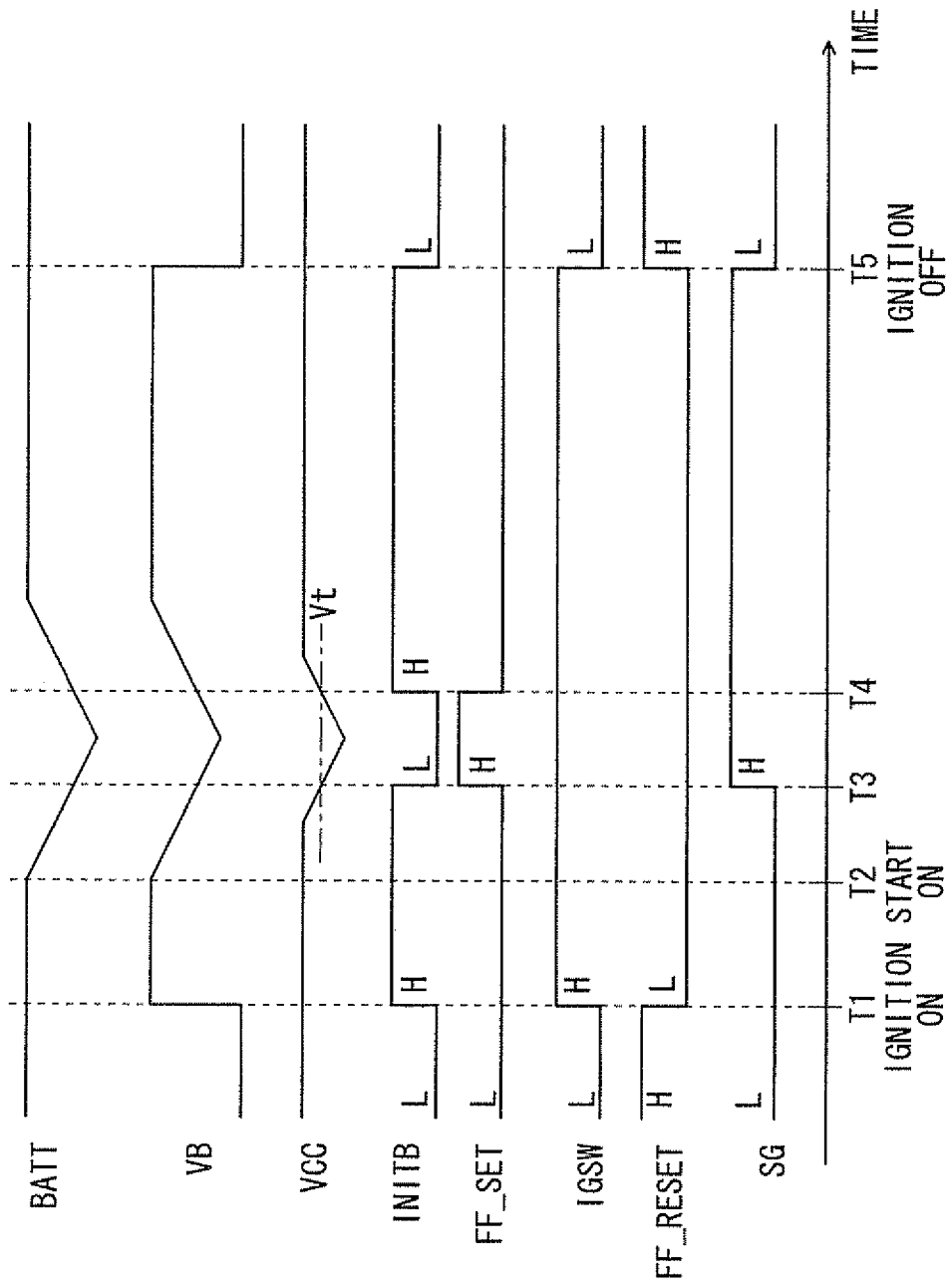
FIG. 4 shows changes of various signals when a voltage of a battery is lowered.

FIG. 4 is a timing chart showing changes of various signals when the voltage of the battery 51 is lowered at the start time of the engine and the microcomputer 2 is thus reset. At the start time of the chart, the ignition switch 52 is turned off and the engine is not started. Also, at the start time, since the ignition switch 52 is turned off, the ignition signal IGSW becomes "L" and a signal FF_RESET that is applied to the reset input terminal R of the flip-flop 4 of the latch circuit 3a becomes "H." Therefore, the stored content of the flip-flop 4 is deleted.

First, at time T1, the ignition switch 52 is turned on by a user's operation. Thereby, the voltage VB of the ignition line downstream from the ignition switch 52 is increased and the ignition switch IGSW becomes "H." Also, the under voltage detection unit 13 having the ignition line as a power-supply line starts up and the reset signal INITB of "H" is output from the reset unit 14. Also, as the ignition signal IGSW becomes "H", the signal FF_RESET that is applied to the reset input terminal R of the flip-flop 4 becomes "L."

Then, at time T2, the start switch is turned on by the user's operation and the power is fed to the starter motor, so that the engine starts. As the engine starts, the voltage BATT of the battery 51 is lowered. When the voltage BATT of the battery 51 is lowered, all the power lines to which the power is fed from the battery 51 are influenced. Accordingly, the voltage VB of the ignition line and the power-supply voltage VCC of the microcomputer 2 are also lowered.

When the power-supply voltage VCC of the microcomputer 2 is lowered and thus becomes below the minimum operating voltage Vt of the microcomputer 2 at time T3, the under voltage detection unit 13 detects the corresponding state and outputs an instruction signal to the reset unit 14. Thereby, the reset unit 14 sets the reset signal INITB to be "L." Thereby, the microcomputer 2 stops the operation thereof for reset.

Also, since the reset signal INITB becomes "L", an inverted "H" signal FF_SET thereof is input to the set input terminal S of the flip-flop 4 of the latch circuit 3a. Thereby, the rest information is stored in the flip-flop 4. Then, the latch signal SG that is output from the flip-flop 4 becomes "H." That is, a prohibiting signal that prohibits the microcomputer 2 from executing the idling stop function is output from the flip-flop 4 of the latch circuit 3a.

After that, when the engine starts, the voltage BATT of the battery 51 is gradually increased. Therefore, the voltage VB of the ignition line and the power-supply voltage VCC of the microcomputer 2 are also increased. Then, when the power-supply voltage VCC of the microcomputer 2 is increased and thus becomes above the minimum operating voltage Vt of the microcomputer 2 at time T4, the reset unit 14 sets the reset signal INITB to be "H" and the microcomputer 2 restarts.

Since the reset signal INITB becomes "H", an inverted "L" signal FF_SET thereof is input to the set input terminal S of the flip-flop 4 of the latch circuit 3a. Even when the signal is input, the stored state of the reset information is kept in the flip-flop 4 and the state in which the prohibiting signal is output from the flip-flop 4 continues. Accordingly, thereafter, the idling stop function is disabled in the microcomputer 2 having restarted. Hence, from time T4 to time T5, the engine is not automatically stopped even when a predetermined stop condition is established on the basis of the signals indicating the traveling state. Thereby, it is possible to prevent the voltage of the battery 51 from being lowered.

At time T5, when the ignition witch 52 is turned off by the user's operation, the voltage VB of the ignition line becomes zero (0) and the ignition signal IGSW becomes "L." Also, the operation of the under voltage detection unit 13 and the like is stopped and the reset signal INITB from the reset unit 14 becomes "L." Also, as the ignition signal IGSW becomes "L", the signal FF_RESET that is applied to the reset input terminal R of the flip-flop 4 becomes "H." Thereby, the reset information is deleted from the flip-flop 4 of the latch circuit 3a and the latch signal SG that is output from the flip-flop 4 becomes "L." Therefore, it does not influence the idling stop function when getting in the vehicle next time.

Like this, according to the idling stop apparatus 1a of this illustrative embodiment, when the reset condition is established, the reset information indicating that the reset condition is established is stored in the latch circuit 3a and the microcomputer 2 disables the idling stop function while the reset information is stored. Since the reset information is stored in the latch circuit 3a even when the microcomputer 2 is being reset and even after the reset, the microcomputer 2 after the reset can disable the idling stop function. As a result, it is possible to prevent the voltage of the battery 51 from being lowered due to the idling stop function.

Also, when it is detected that the ignition switch 52 is turned off, the latch circuit 3a deletes the reset information of the flip-flop 4. Accordingly, it is possible to enable the idling stop function when getting in the vehicle next time.

1-3. Stop of Operation of Flip-Flop

In the operation described with reference to FIG. 4, it has been described that the operation of the flip-flop 4 of the latch circuit 3a is not stopped. However, there is a possibility that the voltage of the battery 51 will be further remarkably lowered and thus the operating power-supply voltage VCC of the flip-flop 4 will be lowered below the minimum operating voltage Vu. In this case, the operation of the flip-flop 4 is stopped with the reset information being stored therein. In the idling stop apparatus 1a, even when the voltage of the battery 51 is considerably lowered and thus the operation of the flip-flop 4 is stopped, it is possible to disable the idling stop function without any problem.

Figure 5:
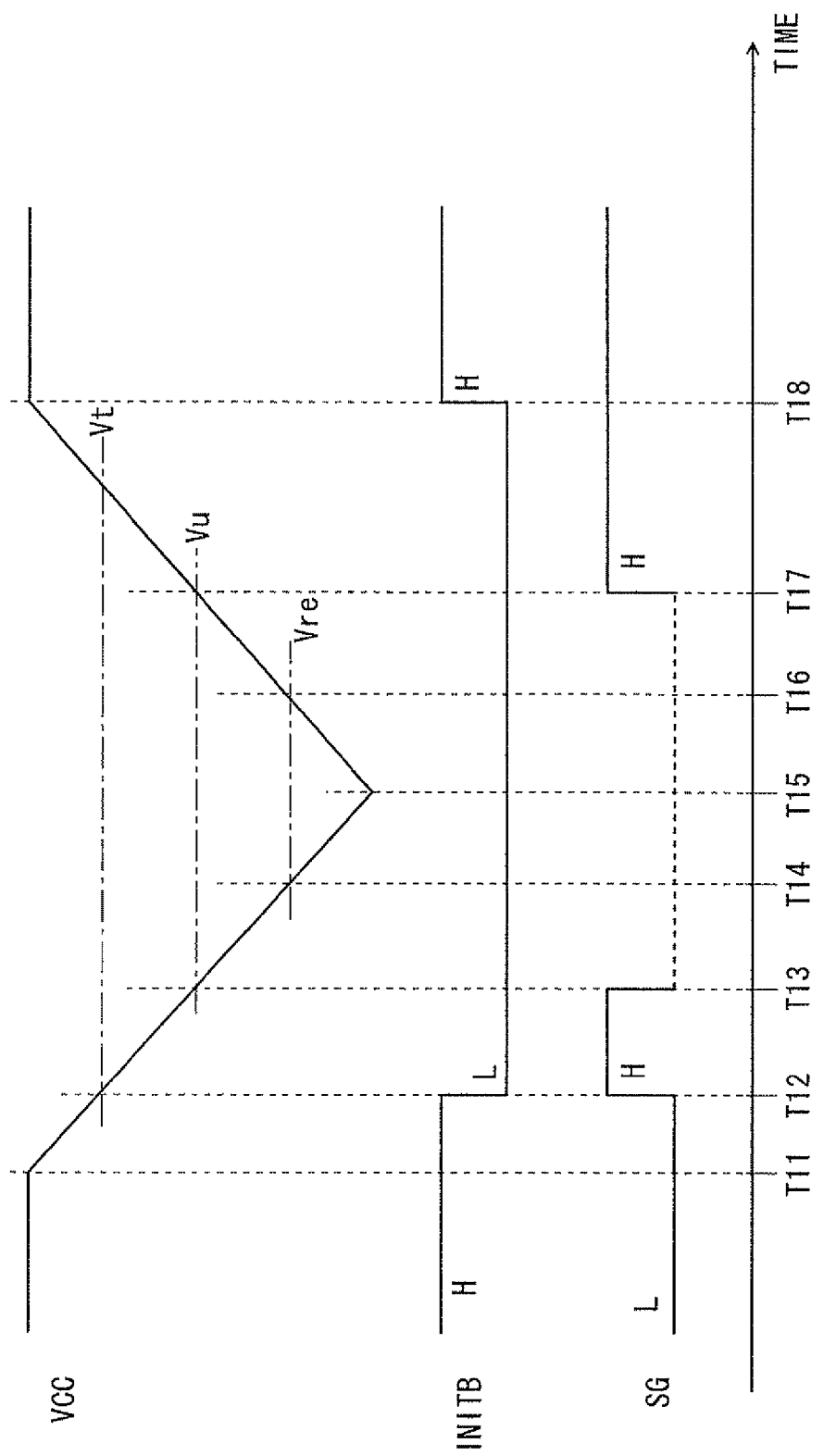
FIG. 5 shows changes of various signals when a voltage of a battery is lowered.

FIG. 5 is a timing chart showing changes of the reset signal INITB and the latch signal SG from the flip-flop 4 when the operating power-supply voltage VCC of the flip-flop 4 is lowered below the minimum operating voltage Vu. At the start time of this chart, the ignition switch 52 is turned on but the engine is not started (a state between time T1 and time T2).

First, the engine starts by the user's operation. As the engine starts, the voltage of the battery 51 is lowered and the power-supply voltage VCC of the microcomputer 2 is also lowered from time T11. Up to time T18, the voltage of the battery 51 and the power-supply voltage VCC of the microcomputer 2 are the substantially same.

At time T12, when the power-supply voltage VCC of the microcomputer 2 becomes below the minimum operating voltage Vt (for example, 3.9V) of the microcomputer 2, the reset unit 14 sets the reset signal INITB to be "L". Thereby, the microcomputer 2 stops the operation thereof for reset. In the meantime, the "H" signal FF_SET is input to the set input terminal S of the flip-flop 4 of the latch circuit 3a, so that the reset information is stored in the flip-flop 4. Then, the latch signal SG that is output from the flip-flop 4 becomes "H."

Also, at time T13, when the power-supply voltage VCC of the microcomputer 2 becomes below the minimum operating voltage Vu (for example, 1.6V) of the flip-flop 4, the operation of the flip-flop 4 is stopped.

When the voltage of the battery 51 is further lowered and thus becomes below the reference voltage Vre (for example, 1.25V), which is applied to the comparator 32 (refer to FIG. 2) for detecting on/off states of the ignition switch 52, at time T14, it is not possible to detect the on/off states of the ignition switch 52.

After that, the engine starts, so that the voltage of the battery 51 or power-supply voltage VCC of the microcomputer 2 starts to increase at time T15. At time T16 at which the voltage of the battery 51 exceeds the reference voltage Vre for detecting on/off states of the ignition switch 52, the on state of the ignition switch 52 is detected. Thereby, the signal FF_RESET that is applied to the reset input terminal R of the flip-flop 4 becomes "L."

Also, at time T17, when the power-supply voltage VCC of the microcomputer 2 exceeds the minimum operating voltage Vu of the flip-flop 4, the flip-flop 4 starts the operation thereof. As described above, the flip-flop 4 is configured to output the "H" latch signal SG at the start time of the operation. Therefore, the flip-flop 4 starts the operation with the reset information being stored therein. At this point of time, since the on state of the ignition switch 52 is being detected already and "L" is applied to the reset input terminal R, the reset information is not deleted.

Then, at time T18, when the power-supply voltage VCC of the microcomputer 2 is increased and thus becomes above the minimum operating voltage Vt of the microcomputer 2, the microcomputer 2 restarts. Since the minimum operating voltage Vt of the microcomputer 2 is higher than the minimum operating voltage Vu of the flip-flop 4, the flip-flop 4 starts the operation thereof at the restarting time at a state in which the flip-flop has already output the "H" latch signal SG (prohibiting signal). Therefore, it is possible to securely output the prohibiting signal to the microcomputer 2 having restarted, so that the idling stop apparatus 1a can perform the stable operation. Thereby, the idling stop function is disabled in the microcomputer 2 having restarted.

As described above, the flip-flop 4 of the latch circuit 3a starts the operation thereof with the reset information being stored therein. Together this, since the minimum operating voltage Vu of the flip-flop 4 is higher than the reference voltage Vre that is compared so as to detect the on/off states of the ignition switch, the reset information is not deleted at the start time T17 of the operation of the flip-flop 4. Therefore, even when the operating power-supply voltage VCC of the flip-flop 4 is lowered below the minimum operating voltage Vu and thus the flip-flop 4 stops the operation thereof, the reset information is not deleted, so that it is possible to disable the idling stop function without any problem.

2. Second Illustrative Embodiment

In the below, a second illustrative embodiment is described. In the first illustrative embodiment, the latch circuit 3a monitors the reset signal INITB, thereby indirectly detecting that the power-supply voltage VCC of the microcomputer 2 becomes below the minimum operating voltage Vt. By such a configuration, it is possible to simplify the configuration of the latch circuit 3a. However, the idling stop function may be disabled even when the reset condition is established due to the runaway of the microcomputer 2 and the like, rather than the voltage lowering of the battery 51. Also, even when the power-supply voltage VCC of the microcomputer 2 is lowered due to a cause except for the voltage lowering of the battery 51, for example a ground fault that occurs in a power-supply line that feeds the power from the second regulator 12 to the microcomputer 2, the idling stop function may be disabled. The second illustrative embodiment is configured to cope with the above situations.

Figure 6:
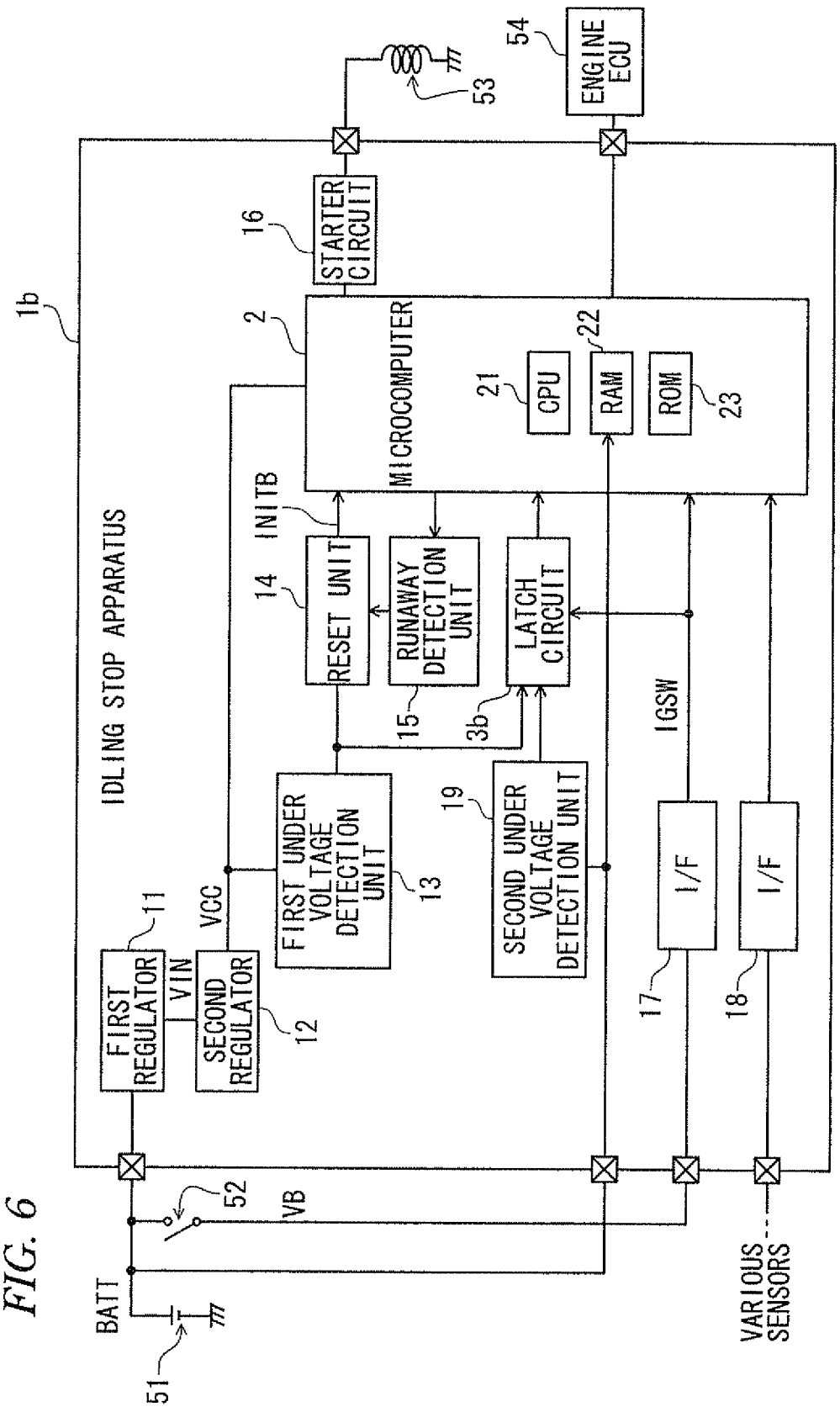
FIG. 6 shows a configuration of an idling stop apparatus according to a second illustrative embodiment.

FIG. 6 is a block diagram showing a configuration of an idling stop apparatus 1b of the second illustrative embodiment and peripheral elements thereof. The configuration of the idling stop apparatus 1b is the substantially same as the idling stop apparatus 1a of the first illustrative embodiment but has two under voltage detection units 13, 19. The first under voltage detection unit 13 is the same as the under voltage detection unit 13 of the first illustrative embodiment and monitors the power-supply voltage VCC of the microcomputer 2. In the meantime, the second under voltage detection unit 19 is adapted to monitor the voltage BATT of the battery 51.

Also, a latch circuit 3b of this illustrative embodiment is input with an output signal from the first under voltage detection unit 13 and an output signal from the second under voltage detection unit 19, instead of the reset signal INITB. The configuration in which the ignition signal IGSW is input to the latch circuit 3b is the same as the first illustrative embodiment.

Figure 7:
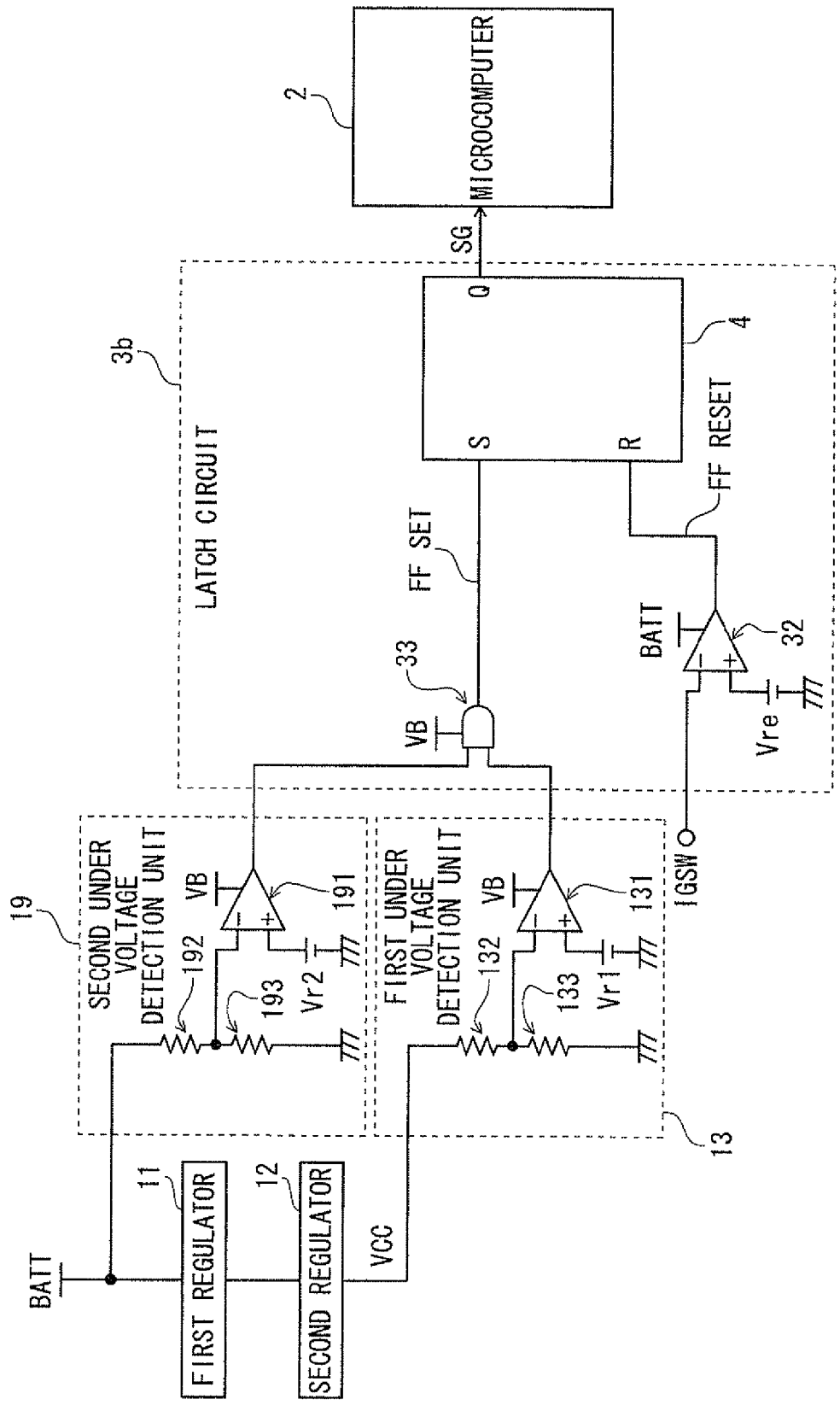
FIG. 7 shows a configuration of a latch circuit of the second illustrative embodiment.

FIG. 7 shows a configuration of the latch circuit 3b of the second illustrative embodiment together with the peripheral constitutional elements thereof. As shown in FIG. 7, the second under voltage detection unit 19 has the substantially same configuration as the first under voltage detection unit 13 and includes a comparator 191. A non-inverting input terminal (+) of the comparator 191 is applied with a predetermined reference voltage Vr2. In the meantime, an inverting input terminal (−) of the comparator 191 is applied with a voltage that is obtained by dividing the voltage BATT of the battery 51 by two resistances 192, 193. By this configuration, when the voltage BATT of the battery 51 becomes below the minimum operating voltage Vt of the microcomputer 2, an "H" signal is output from an output terminal of the comparator 191.

Also, the latch circuit 3b has the flip-flop 4, an AND circuit 33 and the comparator 32. The flip-flop 4 and the comparator 32 are the same as those of the first illustrative embodiment. The set input terminal S of the flip-flop 4 is connected with an output terminal of the comparator 33. The AND circuit 33 is input with both an output signal from the first under voltage detection unit 13 and an output signal from the second under voltage detection unit 19.

Accordingly, when both the output signal from the first under voltage detection unit 13 and the output signal from the second under voltage detection unit 19 are "H", "H" is input to the set input terminal S of the flip-flop 4. That is, in this case, the latch circuit 3b detects that the reset condition for resetting the microcomputer 2 is established, and the reset information is thus stored in the flip-flop 4.

The case where the output signal from the first under voltage detection unit 13 is "H" indicates that the power-supply voltage VCC of the microcomputer 2 becomes below the minimum operating voltage Vt of the microcomputer 2. In the meantime, the case where the output signal from the second under voltage detection unit 13 is "H" indicates that the voltage BATT of the battery 51 becomes below the minimum operating voltage Vt of the microcomputer 2. Accordingly, when both the power-supply voltage VCC of the microcomputer 2 and the voltage BATT of the battery 51 become below the minimum operating voltage Vt, it is determined that the reset condition is established. The other operations are the same as the first illustrative embodiment.

Like this, according to the second illustrative embodiment, the power-supply voltage VCC of the microcomputer 2 is directly monitored, rather than the reset signal INITB, so that it is detected that the reset condition is established. Therefore, when the reset condition is established due to a cause except for the voltage drop, such as runaway of the microcomputer 2, it is possible to prevent the idling stop function from being disabled.

Also, it is detected that the reset condition is established by monitoring both the power-supply voltage VCC of the microcomputer 2 and the voltage BATT of the battery 51. Therefore, when the power-supply voltage VCC of the microcomputer 2 is lowered due to a cause except for the voltage drop of the battery 51, for example a ground fault that occurs in the power-supply line that feeds the power to the microcomputer 2, it is possible to prevent the idling stop function from being disabled.

3. Third Illustrative Embodiment

Figure 8:
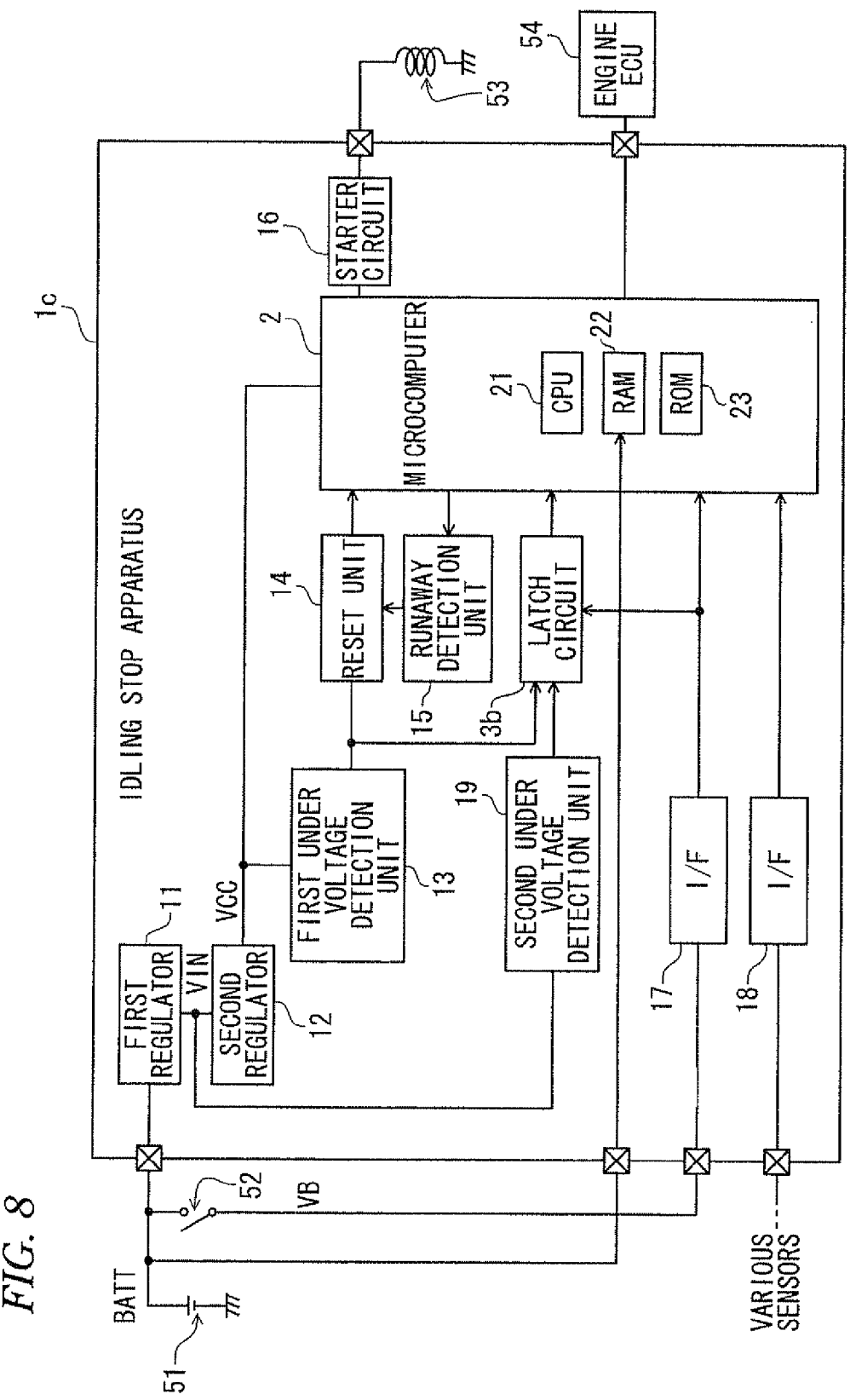
FIG. 8 shows a configuration of an idling stop apparatus according to a third illustrative embodiment.
Figure 9:
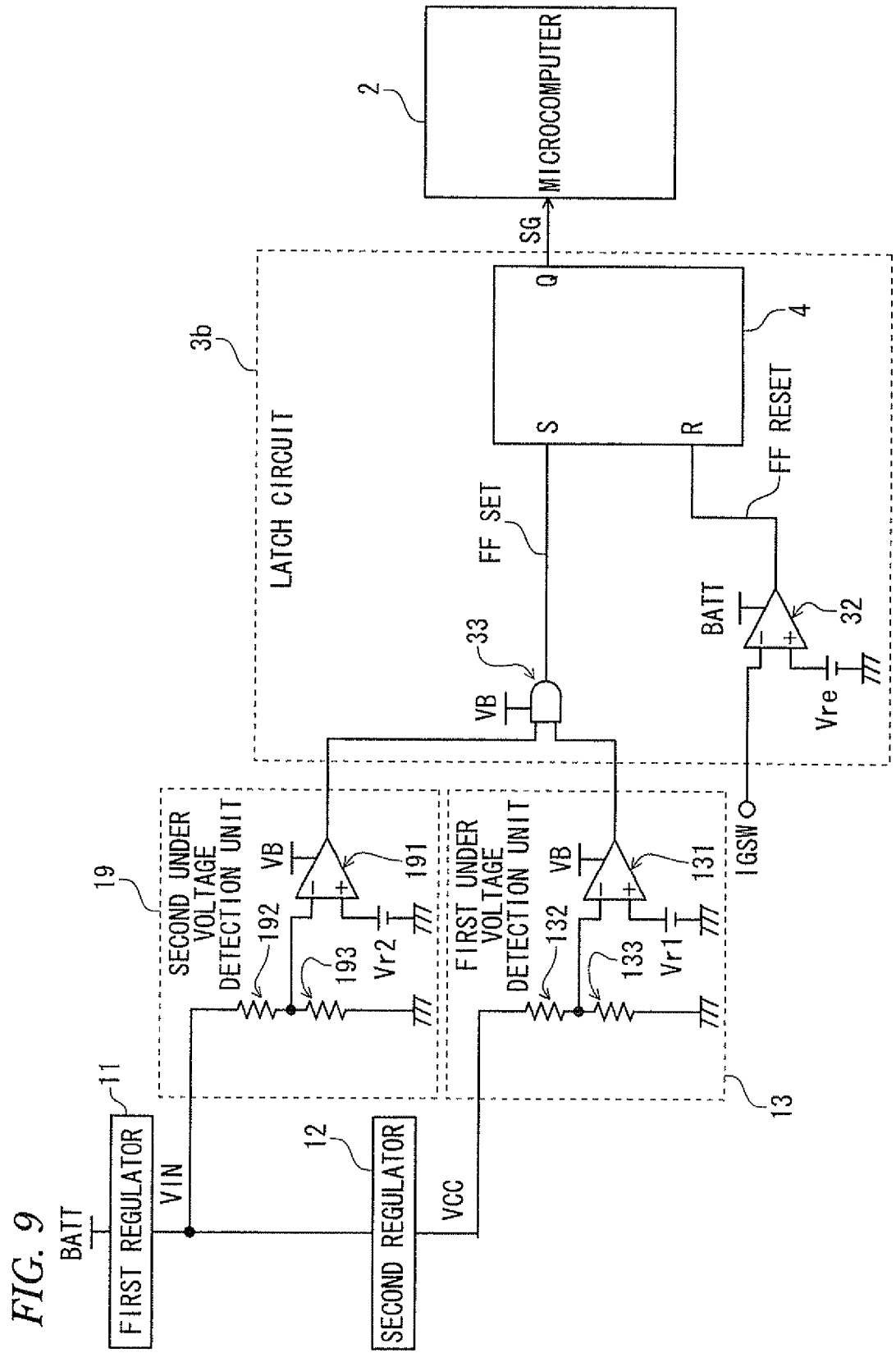
FIG. 9 shows a configuration of a latch circuit of the third illustrative embodiment.

In the below, a third illustrative embodiment is described. FIG. 8 is a block diagram showing a configuration of an idling stop apparatus 1c of the third illustrative embodiment and peripheral elements thereof. Also, FIG. 9 shows a configuration of the latch circuit 3b of the third illustrative embodiment together with the peripheral constitutional elements thereof.

The configuration and operation of the idling stop apparatus 1c of the third illustrative embodiment are the substantially same as those of the idling stop apparatus 1b of the second illustrative embodiment. In the second illustrative embodiment, the second under voltage detection unit 19 is adapted to monitor the voltage BATT of the battery 51. Compared to this, in the third illustrative embodiment, the second under voltage detection unit 19 monitors the voltage VIN that is obtained by lowering the voltage BATT of the battery 51 in the first regulator 11. That is, the voltage VIN between the first regulator 11 and the second regulator 12 is monitored. Since a distance between the first regulator 11 and the second regulator 12 is relatively close, there is a very low possibility that a ground fault will occur at the corresponding position.

When the battery 51 is lowered, the voltage YIN is also lowered. Accordingly, it is possible to detect the voltage lowering of the battery 51 by monitoring the voltage VIN. Hence, likewise the second illustrative embodiment, when the power-supply voltage VCC of the microcomputer 2 is lowered due to a cause except for the voltage drop of the battery 51, it is possible to prevent the idling stop function from being disabled.

Also, the voltage BATT of the battery 51 is susceptible to the other parts mounted on the vehicle, so that there is a high possibility that a noise will be caused therein. Therefore, by monitoring the voltage VIN that is obtained by decreasing the voltage BATT of the battery 51 in the first regulator 11, it is possible to reduce the influence of the noise. Hence, compared to the configuration in which the voltage BATT of the battery 51 is directly monitored, it is possible to stably detect that the reset condition is established.

4. Fourth Illustrative Embodiment

In the below, a fourth illustrative embodiment is described. In the first illustrative embodiment, the flip-flop 4 is configured to output the "H" latch signal SG at the start time of the operation. Compared to this, the flip-flop 4 may be configured to output the "L" latch signal SG at the start time of the operation.

Figure 10:
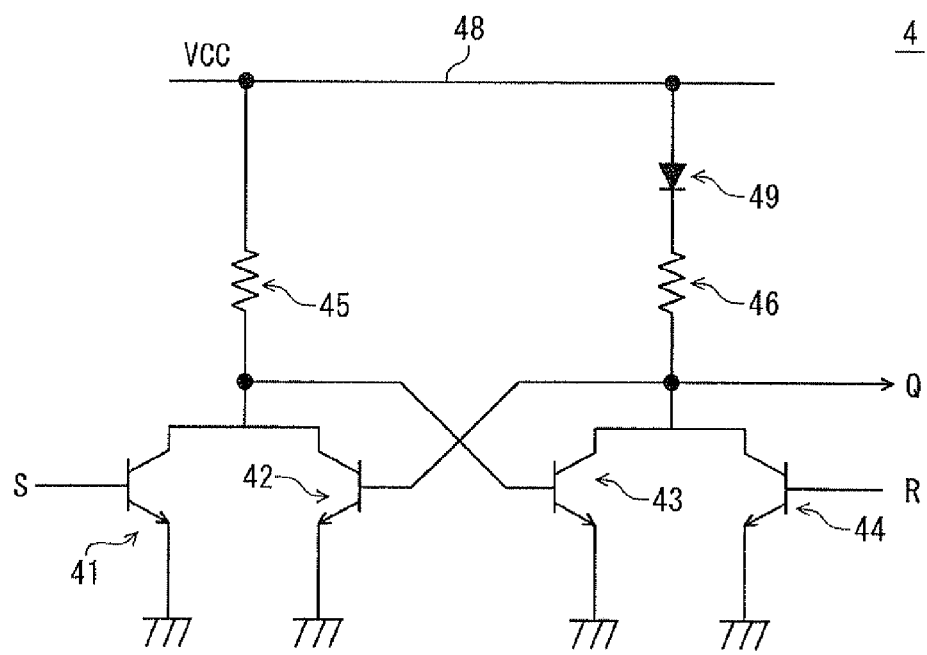
FIG. 10 shows a configuration of a flip-flop of a fourth illustrative embodiment.

FIG. 10 shows an example of the configuration of the flip-flop 4. The flip-flop 4 is the substantially same as the flip-flop 4 shown in FIG. 3. However, the diode 47 is not provided between the collectors of the first transistor 41 and second transistor 42 and the power-supply line 48. In the meantime, a diode 49 is provided between the collectors of the third transistor 43 and fourth transistor 44 and the power-supply line 48.

In the flip-flop 4 of FIG. 10, a current path from the power-supply line 48 to the ground includes a first path passing to the resistance 45 and between the base and emitter of the third transistor 43 and a second path passing to the diode 49, the resistance 46 and between the base and emitter of the second transistor 42.

A case is assumed in which the operating power-supply voltage of the flip flop 4 is gradually increased. Since the diode 49 exists on the second path, the second path is influenced by a voltage drop as much as that. Therefore, the base of the third transistor 43 on the first path becomes "H" faster than the base of the second transistor 42 on the second path. Hence, the operation of the flip-flop 4 is stabilized at a state in which the base of the second transistor 42 is "L" and the base of the third transistor 43 is "H." Thereby, the flip-flop 4 of FIG. 10 outputs "L" from the output terminal Q at the start time of the operation.

A case is described in which when the flip-flop 4 is used, the operating power-supply voltage VCC of the flip-flop 4 is lowered below the minimum operating voltage Vu, as shown in FIG. 5.

At time T12, when the power-supply voltage VCC becomes below the minimum operating voltage Vt (for example, 3.9V) of the microcomputer 2, the reset unit 14 sets the reset signal INITB to be "L." Thereby, the microcomputer 2 stops the operation thereof for reset. In the meantime, the "H" signal FF_SET is input to the set input terminal S of the flip-flop 4 of the latch circuit 3a and the reset information is stored in the flip-flop 4. Then, the latch signal SG that is output from the flip-flop 4 becomes "H."

Also, at time T13, when the power-supply voltage VCC becomes below the minimum operating voltage Vu (for example, 1.6V) of the flip-flop 4, the flip-flop 4 stops the operation thereof.

After that, when the engine starts and the power-supply voltage VCC exceeds the minimum operating voltage Vu of the flip-flop 4 at time T17, the flip-flop 4 starts the operation thereof. At this start time of the operation, the flip-flop 4 is configured to output the "L" latch signal SG. Therefore, the flip-flop 4 starts the operation with the reset information not being stored.

However, at this point of time, since the reset signal INITB keeps the state "L", the "H" signal FF_SET is input to the set input terminal S of the flip-flop 4 of the latch circuit 3a. Accordingly, the reset information is again stored in the flip-flop 4 and the latch signal SG that is output from the flip-flop 4 becomes "H" instantaneously.

At time T18, when the power-supply voltage VCC of the microcomputer 2 in increased and thus becomes above the minimum operating voltage Vt of the microcomputer 2, the microcomputer 2 restarts. The minimum operating voltage Vt of the microcomputer 2 is higher than the minimum operating voltage Vu of the flip-flop 4 and the flip-flop 4 outputs the "H" latch signal SG (prohibiting signal) at the restart time. Therefore, it is possible to securely output the prohibiting signal to the microcomputer 2, so that the idling stop apparatus can perform the stable operation.

Like this, even when the flip-flop 4 is configured to output the "L" latch signal SG at the start time of the operation, it is possible to normally disable the idling stop function of the microcomputer 2 even after the power-supply voltage VCC is lowered below the minimum operating voltage Vu of the flip-flop 4.

5. Modified Embodiments

Although the illustrative embodiments have been described, the invention is not limited to the above illustrative embodiments and various modifications can be made. In the below, the modified embodiments are described. The above illustrative embodiments and below embodiments can be appropriately combined.

In the second illustrative embodiment, both the power-supply voltage VCC of the microcomputer 2 and the voltage BATT of the battery 51 are monitored. However, only one voltage may be monitored. Also, in the third illustrative embodiment, both the power-supply voltage VCC of the microcomputer 2 and the voltage VIN between the first regulator 11 and the second regulator 12 are monitored. However, only one voltage may be monitored.

Also, in the third illustrative embodiment, there are provided two regulators that decrease the voltage of the battery 51. However, when three or more regulators are provided, a voltage between any two regulators may be monitored.

Also, regarding the storage that stores the reset information, a memory having a relatively large storage capacity may be adopted. However, like the above illustrative embodiments, it is possible to realize the idling stop apparatus at very low cost by configuring the storage with only one logic circuit capable of storing information of 1 bit, compared to a configuration in which a memory having a relatively large storage capacity and the like is used.

Also, in the above illustrative embodiments, the various functions are software-implemented by the calculation processing of the CPU in response to the programs. However, parts of the functions may be implemented by an electrical hardware circuit. Also, to the contrary, a part of functions that are implemented by the hardware circuit may be software-implemented.

This application is based on Japanese Patent Application (Patent Application No. 2009-220747) filed on Sep. 25, 2009, the disclosures of which are incorporated herein by reference.

DESCRIPTION OF REFERENCE NUMERALS

2: microcomputer
4: flip-flop
11: first regulator
12: second regulator
13: under voltage detection unit
3a: latch circuit
3b: latch circuit
51: battery
52: ignition switch

The invention claimed is:

1. An idling stop apparatus to be mounted on a vehicle, comprising:
   a microcomputer, having an idling stop function of automatically stopping an engine of the vehicle when a predetermined stop condition is established and of automatically starting the engine when a predetermined start condition is established while the engine is stopped;
   a detector, that detects that a power-supply voltage of the microcomputer is below a first voltage, the first voltage being a minimum operating voltage of the microcomputer; and
   a flip-flop, that stores reset information when the detector detects that the power-supply voltage of the microcomputer is below the first voltage, and outputs a signal for prohibiting the microcomputer from executing the idling stop function while the flip-flop is storing the reset information,
   wherein the first voltage is higher than a second voltage, the second voltage being a minimum operating voltage of the flip-flop, and
   when, after the flip-flop stops operating, the flip-flop starts operating again upon starting of the engine, the flip-flop stores the reset information again when the detector detects that the power-supply voltage of the microcomputer is below the first voltage.

2. A method for disabling an idling stop function of automatically stopping an engine of a vehicle when a predetermined stop condition is established and of automatically starting the engine when a predetermined start condition is established during the engine is stopped, the method comprising:
   detecting, by a detector, that a power-supply voltage of a microcomputer having the idling stop function is below a first voltage, the first voltage being a minimum operating voltage of the microcomputer;
   storing, by a flip-flop, reset information when the detector detects that the power-supply voltage of the microcomputer is below the first voltage;
   outputting, by the flip-flop, a signal for prohibiting the microcomputer from executing the idling stop function while the flip-flop is storing the reset information; and
   when, after the flip-flop stops operating, the flip-flop starts operating again upon starting of the engine, storing, by the flip-flop, the reset information again when the detector detects that the power-supply voltage of the microcomputer is below the first voltage,
   wherein the first voltage is higher than a second voltage, the second voltage being a minimum operating voltage of the flip-flop.

3. The idling stop apparatus according to claim 1, wherein the flip-flop deletes the reset information when an ignition switch of the vehicle is turned off, and
   wherein the second voltage is higher than a reference voltage which is used for detecting that the ignition switch is turned on.

4. The idling stop apparatus according to claim 1, wherein the power-supply voltage of the microcomputer is obtained by decreasing a voltage of a battery of the vehicle.

5. The method according to claim 2, further comprising deleting, by the flip-flop, the reset information when an ignition switch of the vehicle is turned off,
   wherein the second voltage is higher than a reference voltage which is used for detecting that the ignition switch is turned on.

6. The method according to claim 2, wherein the power-supply voltage of the microcomputer is obtained by decreasing a voltage of a battery of the vehicle.

* * * * *